United States Patent [19]
Sue et al.

[11] Patent Number: 6,124,564
[45] Date of Patent: Sep. 26, 2000

[54] HARDFACING COMPOSITIONS AND HARDFACING COATINGS FORMED BY PULSED PLASMA-TRANSFERRED ARC

[75] Inventors: J. Albert Sue, The Woodlands; Alysia Canson White, Kingwood; Zhigang Fang, The Woodlands, all of Tex.

[73] Assignee: Smith International, Inc., Houston, Tex.

[21] Appl. No.: 09/153,130

[22] Filed: Sep. 15, 1998

Related U.S. Application Data

[60] Provisional application No. 60/072,275, Jan. 23, 1998.

[51] Int. Cl.$^7$ .................................................. B23K 10/00
[52] U.S. Cl. ............................... 219/121.47; 219/121.57; 219/121.59; 219/76.16; 427/453; 427/576; 175/327
[58] Field of Search ........................... 219/121.47, 76.15, 219/76.16, 121.59, 121.48, 121.57; 427/446, 456, 453, 576, 569; 175/327

[56] References Cited

U.S. PATENT DOCUMENTS

| | | | |
|---|---|---|---|
| 3,461,983 | 8/1969 | Hudson et al. | 175/375 |
| 3,513,728 | 5/1970 | Hudson et al. | 76/108 |
| 3,839,618 | 10/1974 | Meuhlberger | 219/121.47 |
| 4,142,089 | 2/1979 | Lau et al. | 219/121.54 |
| 4,298,783 | 11/1981 | Schneider et al. | 219/75 |
| 4,376,793 | 3/1983 | Jackson | 427/34 |
| 4,472,619 | 9/1984 | Ueda et al. | |
| 4,689,463 | 8/1987 | Shubert | 219/76.16 |
| 4,829,153 | 5/1989 | Correy | 219/130.4 |
| 4,836,307 | 6/1989 | Keshavan et al. | 175/374 |
| 4,864,094 | 9/1989 | Saltzman et al. | 219/77 |
| 4,923,511 | 5/1990 | Krizan et al. | 75/252 |
| 5,293,026 | 3/1994 | Dennis et al. | 219/121.59 |
| 5,535,838 | 7/1996 | Keshavan et al. | 175/374 |
| 5,663,512 | 9/1997 | Schader et al. | |
| 5,900,272 | 5/1999 | Goodman | 427/446 |

FOREIGN PATENT DOCUMENTS

| | | |
|---|---|---|
| 0 043 103 A1 | 1/1982 | European Pat. Off. |
| 0 234 848 | 9/1987 | European Pat. Off. |
| 0 571 210 A1 | 11/1993 | European Pat. Off. |
| 2 007 720 | 5/1979 | United Kingdom. |

*Primary Examiner*—Mark Paschall
*Attorney, Agent, or Firm*—Rosenthal & Osha L.L.P.

[57] ABSTRACT

A new hardfacing composition is disclosed. In addition, a pulsed plasma transferred arc method for depositing hardfacing material with a higher content of carbide and lower dilution by a substrate metal is disclosed. The disclosed method produces a hardfacing coating which has a strong metallurgical bond to the substrate metal. The method includes the following steps: (1) establishing a transferred plasma arc between an electrode and an area of a work piece, (2) optionally preheating the work piece to at least 250° F., (3) forming a plasma column of inert gas in the arc by passing an electrical current between the electrode and the work piece, (4) feeding a stream of hardfacing material in powder form into the plasma column, and (5) pulsing the current between a pre-selected high pulse current value and low pulse current value while feeding the powdered hardfacing material. In this method, the low pulse current is selected to be sufficiently high to melt at least one component of the hardfacing material. The pulse rate and the high pulse current are selected to minimize the formation of a weld pool on the metal substrate during the hardfacing process. This method has applications in hardfacing any metallic work piece which requires wear resistance or erosion resistance. This method is especially effective in hardfacing roller cone surfaces and the milled teeth of a rock bit for erosion and wear protection.

52 Claims, 7 Drawing Sheets

HARDFACING COMPOSITIONS AND HARDFACING COATINGS FORMED BY PULSED PLASMA-TRANSFERRED ARC

CROSS-REFERENCE TO RELATED APPLICATIONS

This application claims to the benefit of U.S. Provisional application Ser. No. 60/072,275, entitled "Forming Hardfacing Coatings by Pulsed Plasma-Transferred Arc," filed Jan. 23, 1998.

FIELD OF THE INVENTION

This invention relates to hardfacing compositions and hardfacing coatings on a metallic work piece and more particularly to deposition of a hardfacing coating on roller cone surfaces of a rock bit.

BACKGROUND OF THE INVENTION

Earth boring or contacting devices, such as rock bits used in petroleum and rock drilling applications, include wear or erosion surfaces exposed to erosive wear due to contact with geological formations. Two types of rock bits are commonly used: tungsten carbide inserts (TCI) rock bits and milled tooth rock bits.

A TCI rock bit is utilized to drill a hard formation because of the enhanced ability of tungsten carbide inserts to penetrate hard formations. However, the tungsten carbide inserts are mounted in a relatively soft metal, e.g., steel, that forms the body of the cutter cone. This relatively soft metal cutter body which holds the inserts in place may be abraded or eroded away when subjected to a high abrasive drilling environment. This abrasion or erosion occurs primarily due to the presence of cuttings from the formation, the direct blasting effect of the drilling fluid utilized in the drilling process, and the rolling and sliding contact of the cone body or cone shell with the formation. When the material supporting the inserts is eroded or abraded away to a substantial extent, the drilling forces being exerted on the inserts may either break the inserts or force them out of the cutter cone when they engage the formation. As a result, the bit may no longer be effective in cutting the formation. Moreover, the loose inserts that break off from the cutter cone may damage other inserts and the cutter cone, and eventually may lead to failure of the cutter cone.

When drilling relatively soft but abrasive formations, individual cutting inserts may penetrate entirely into the abrasive formation, causing the formation to come into contact with the cutter cone or cone shell. When this contact occurs, the relatively soft cone shell material will erode away, namely at the edges of the surface lands, until the previously embedded portion of the insert becomes exposed and the retention ability in the cone shell is reduced, which may result in the loss of the insert and reduction of the life of the bit. To protect the cutter cone from erosion, hardfacing material, such as tungsten carbide, has been applied to the cone surfaces by a variety of methods.

Milled tooth rock bits are another important type of rock bits used in petroleum and mining drilling applications. A milled tooth bit has a roller cone with teeth protruding from the surface of the cone for engaging the rock. The teeth are made of hardened steel and generally are triangular in a cross-section (taken in a plane perpendicular to the axis of the cone). The principal faces of such a milled tooth that engage the rock usually are dressed with a layer of hardfacing material to increase wear-resistance.

With respect to hardfacing cone surfaces of rock bits for erosion protection, different approaches have been developed with varying degree of success. For example, small, flat-top compacts made of hard material may be placed in the vulnerable cutter shell areas by a silicate bonding agent to prevent erosion. Thermal spraying, plasma arc, and welding arc also may be used to coat the exposed surfaces, including the inserts, of a cutter cone with a wear resistant material.

Although hardfacing coatings in accordance with existing methods protect cones from erosion to some extent, they are relatively unsatisfactory in their erosion protection performance. It is recognized that a good hardfacing coating preferably has a high carbide content and possesses strong bonding to the cone surface.

In a high energy deposition process, such as thermal spraying, plasma arc, and welding arc, dissolution of the carbides in the hardfacing material may occur extensively due to the long duration of high temperatures the carbide is subjected to. In addition, the high temperature in a plasma arc or welding arc process may cause the substrate metal to melt and diffuse into the hardfacing material. On the other hand, in thermal spraying and a low energy process (e.g., use of silicate bonding agents), the bonding between the hardfacing and the cone surface may be relatively weak.

Therefore, there exists a need for a method capable of depositing a hardfacing coating with a relatively higher carbide content and low substrate dilution while, at the same time, achieving strong metallurgical bonding to the substrate metal.

SUMMARY OF THE INVENTION

In one aspect, the invention relates to a method of depositing a hardfacing material on a metal substrate. The method includes: (1) forming a plasma column immediately adjacent to an area of a metal substrate; (2) feeding a hardfacing material into the plasma column; (3) pulsing an electrical current through the plasma at a pulse rate; and (4) controlling the pulsing of the electrical current to minimize the formation of a weld pool in the area so that a hardfacing coating is deposited in the area of the metal substrate. Optionally, the method may include pre-heating the metal substrate to a temperature of at least 250° F. In some embodiments, the act of controlling includes controlling the pulse rate. In other embodiments, the electrical current may be pulsed between a pre-determined high pulse current and a pre-determined low pulse current. In some embodiments, the act of controlling includes controlling the predetermined high pulse current. Furthermore, it may include controlling the pulse rate and the predetermined high pulse current. In some embodiments, the pre-determined low pulse current is selected to be high enough to melt at least one component of the hardfacing material. In other embodiments, the pre-determined low pulse current is in the range of about 30–100 amps. In some embodiments, the high pulse current is in the range of about 80–250 amps. In some embodiments, the pulse rate is at least 20 cycles per second.

In another aspect, the invention relates to a method of manufacturing a hardfaced roller cone. The method includes (1) providing a roller cone; (2) forming a plasma column immediately adjacent to an area susceptible to erosion or wear on the roller cone; (3) feeding a hardfacing material into the plasma column; (4) pulsing an electrical current through the plasma at a pulse rate; and (5) controlling the pulsing of the electrical current to minimize the formation of a weld pool in the area so that a hardfacing coating is deposited in the desired area of the roller cone.

In yet another aspect, the invention relates to a method of manufacturing a hardfaced rock bit. The method includes (1) providing a rock bit having a roller cone, the rock bit including an area susceptible to wear or erosion; (2) forming a plasma column immediately adjacent to the area; (3) feeding a hardfacing material into the plasma column; (4) pulsing the electrical current through the plasma at a pulse rate; and (5) controlling the pulsing of the electrical current to minimize the formation of a weld pool in the desired area and to deposit a hardfacing coating in the area of the rock bit.

In yet another aspect, the invention relates to a hardfaced earth-boring device. The earth-boring device is manufactured by the following method: (1) providing an earth-boring device having a metal substrate; (2) forming a plasma column immediately adjacent to an area of the metal substrate; (3) feeding a hardfacing material into the plasma column; (4) pulsing the electrical current through the plasma at a pulse rate; and (5) controlling the pulsing of the electrical current to minimize the formation of a weld pool in the area so that a hardfacing coating is deposited in the desired area of the metal substrate.

In yet another aspect, the invention relates to a hardfaced roller cone. The hardfaced roller cone is manufactured by the following method: (1) providing a roller cone; (2) forming a plasma column immediately adjacent to an area susceptible to erosion or wear on the roller cone; (3) feeding a hardfacing material into the plasma column; (4) pulsing the electrical current through the plasma at a pulse rate; and (5) controlling the pulsing of the electrical current to minimize the formation of a weld pool in the area so that a hardfacing coating is deposited in the desired area of the roller cone.

In yet another aspect, the invention relates a hardfaced rock bit. The hardfaced rock bit is manufactured by the following method: (1) providing a rock bit having a roller cone where the rock bit includes an area susceptible to wear or erosion; (2) forming a plasma column immediately adjacent to the area; (3) feeding a hardfacing material into the plasma column; (4) pulsing the electrical current through the plasma at a pulse rate; and (5) controlling the pulsing of the electrical current to minimize the formation of a weld pool in the area where a hardfacing coating is being deposited on the rock bit.

In yet another aspect, the invention relates to a hardfacing composition. The hardfacing composition includes (1) one or more carbides selected from the group consisting of single crystal WC, eutectic $WC/W_2C$, and sintered WC/Co; and (2) a cobalt and chromium alloy matrix including about 65% by weight of cobalt, about 27% by weight of chromium, and about 6% by weight of molybdenum. Alternatively, the hardfacing composition may include (1) vanadium carbide; (2) one or more carbides selected from the group consisting of cast tungsten carbide and sintered tungsten carbide; and (3) a metallic matrix material component.

In yet another aspect, the invention relates to a hardfacing coating formed by the following method. The method includes (1) providing a hardfacing composition; and (2) heating the composition to a temperature sufficient to melt at least one component of the composition so that a hardfacing coating is deposited on a metal substrate. The hardfacing composition includes one or more carbides selected from the group consisting of single crystal WC, eutectic $WC/W_2C$, and sintered WC/Co, and a cobalt and chromium alloy matrix including about 65% by weight of cobalt, about 27% by weight of chromium, and about 6% by weight of molybdenum.

In yet another aspect, the invention relates to a hardfacing coating formed by the following method. The method includes (1) providing a hardfacing composition; and (2) heating the composition to a temperature sufficient to melt at least one component of the composition so that a hardfacing coating is deposited on a metal substrate. The hardfacing composition includes vanadium carbide, one or more carbides selected from the group consisting of cast tungsten carbide and sintered tungsten carbide, and a metallic matrix material component.

In yet another aspect, the invention relates to a hardfacing coating over a substrate. The hardfacing coating includes (1) a carbide phase including a primary carbide and a secondary carbide; and (2) a binder matrix, the carbide phase being dispersed in the binder matrix. In some embodiments, the primary carbide of the carbide phase may include one of single crystal WC, eutectic $WC/W_2C$ and sintered WC/Co, and the secondary carbide of the carbide phase may include one of VC, TiC, $Cr_3C_2$, $Cr_7C_3$ and $Cr_{23}C_6$. Alternatively, the primary carbide of the carbide phase includes one of VC, eutectic $WC/W_2C$, and sintered WC/Co. In other embodiments, the binder matrix includes a metallic matrix and a non-metallic composition. The metallic matrix may include one of cobalt, nickel, iron and alloys thereof. It may further include one or more of the following materials: silicon, aluminum, boron, tungsten, molybdenum, tantalum, and/or another transition metal. The non-metallic composition may include a secondary carbide and a boride. It may further include an Eta phase. The secondary carbide may include one of VC, TiC, $Cr_3C_2$, $Cr_7C_2$, and $Cr_{23}C_6$. The boride may include one of CrB, $TiB_2$, and $ZrB_2$.

DETAILED DESCRIPTION OF THE PREFERRED EMBODIMENTS

Embodiments of the invention provide hardfacing compositions and hardfacing coatings with a relatively high carbide content, a low dilution by a substrate metal, and strong metallurgical bonding to the substrate metal by a pulsed plasma-transferred arc process.

Figure 1:
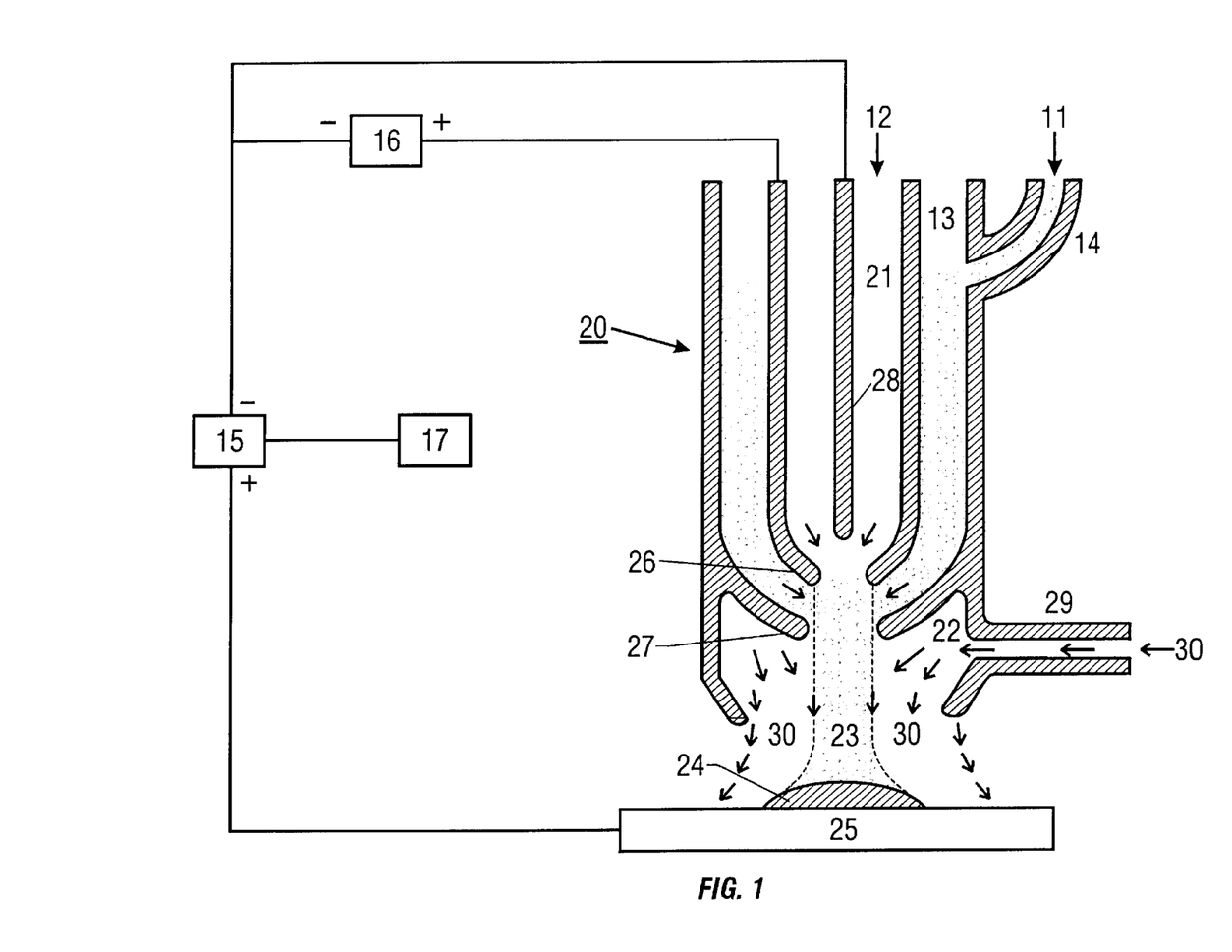
FIG. 1 is a schematic view of a pulsed plasma-transferred arc apparatus according to one embodiment of the invention.

FIG. 1 illustrates one embodiment of the pulsed plasma-transferred arc process. The apparatus generally includes a torch 20, and non-consumable electrode 28, a pilot arc welding power supply 16, a main arc power supply 15 and a pulse controller 17. The torch 20 generally is of conventional construction and includes a first passage 21 for receiving plasma-forming gas 12, a second passage 13 for receiving a flow of powdered hardfacing material 11 and a third passage 22 concentric to the second passage for receiving a flow of shielding gas 30. Additionally, the torch has a restricting orifice 26 at the end of the passage 21 through which a flow of inert gas is directed toward a work piece or substrate 25. Optionally, the torch may include a collimating orifice 27 for controlling the shape of plasma column 23.

As illustrated in FIG. 1, electrode 28 and restricting orifice 26 are connected to the pilot arc power supply 16. A primary arc is generated between electrode 28 and restricting orifice 26 when an arc current is supplied by the pilot arc power supply 16. Generally, the electrode 28 is connected to the negative terminal of the power source 16 while the restricting orifice 26 of the torch is connected to the positive terminal of the power supply 16.

The main arc power supply 15 is connected to and between the electrode 28 and the substrate 25 in order to provide the arc current to establish a plasma column between the electrode 28 and the substrate 25. The electrode 28 is connected to the negative terminal of the power supply 15 while the substrate 25 is connected to the positive terminal of the power supply 15. After a primary arc of inert gas 12 is established between electrode 28 and substrate 25, a current is supplied by the main arc power supply between electrode 28 and substrate 25 to create a plasma column 23. A powder of hardfacing material 11 is introduced into the second passage 13 by a connecting tube 14. This usually is achieved by use of an inert gas as a carrier for the hardfacing powder 11. The hardfacing powder typically includes one or more metallic components and one or more non-metallic components. Once inside the second passage, the hardfacing powder is carried into the plasma column by the inert gas inside the torch. While in the plasma column 23, at least one component of the hardfacing material is melted by the plasma column and a layer 24 of the hardfacing material 11 is subsequently deposited on the substrate. To protect the hardfacing material and substrate from oxidation and contamination, a shielding gas 30 is introduced into the third passage 22 by a connecting tube 29. During the deposition process, the current supplied by the main arc power supply 15 to electrode 28 and substrate 25 is pulsed by a pulse controller 17 between a high pulse current and a low pulse current.

In some embodiments, the following steps are used to deposit a layer of hardfacing material on a metallic work piece: (1) establishing a transferred plasma arc between an electrode and an area of the work piece, (2) forming a plasma column of inert gas in the arc by passing an electrical current between the electrode and the work piece, (3) feeding a stream of the hardfacing material in powder form into the plasma column, and (4) pulsing the current at a selected pulse rate between a pre-selected high pulse current value and low pulse current value while the powdered hardfacing material is fed into the plasma column. Optionally, the work piece may be preheated to a temperature of at least 250° F.

The low pulse current generally is selected to be high enough to melt at least one component of the hardfacing material, whereas the pulse rate and the high pulse current are selected so that formation of a weld pool of the substrate metal is minimized during the deposition process.

This differs from existing pulsed plasma-transferred arc processes in which a sizable weld pool is formed on the substrate. The formation of a weld pool is undesirable because the carbides in the hardfacing material tend to dissolve in the weld pool, resulting in changes to the chemical composition and morphology of the deposited hardfacing material. Such changes may alter or degrade the mechanical properties of the final work piece. Furthermore, the formation of a weld pool may cause the molten metal to diffuse into the hardfacing coating, resulting in substrate dilution of the coating.

Generally speaking, the higher the carbide content in a hardfacing coating, the better its wear resistance and erosion resistance. By melting at least one component of the hardfacing material and minimizing the formation of a weld pool on the surface of the substrate, embodiments of the invention advantageously preserve the carbide phase in the hardfacing material and reduce substrate dilution, while allowing the hardfacing material to be strongly bonded to the substrate.

This metallurgical bonding is further strengthened by including an optional step of preheating the work piece to a temperature of at least 250° F. before the hardfacing material is deposited. The preheating may be achieved by any method, for example, by a torch or an oven. This step reduces the otherwise large difference between the ambient temperature of the work piece and the temperature of the hardfacing material in the plasma column; this large temperature difference may induce cracking of the hardfacing coating. It is observed that the preheating step has reduced the cracking of the hardfacing coating after solidification and subsequent cooling to ambient temperature. This has led to increased mechanical strength, including enhanced wear and erosion resistance, of the coating.

Figure 2:
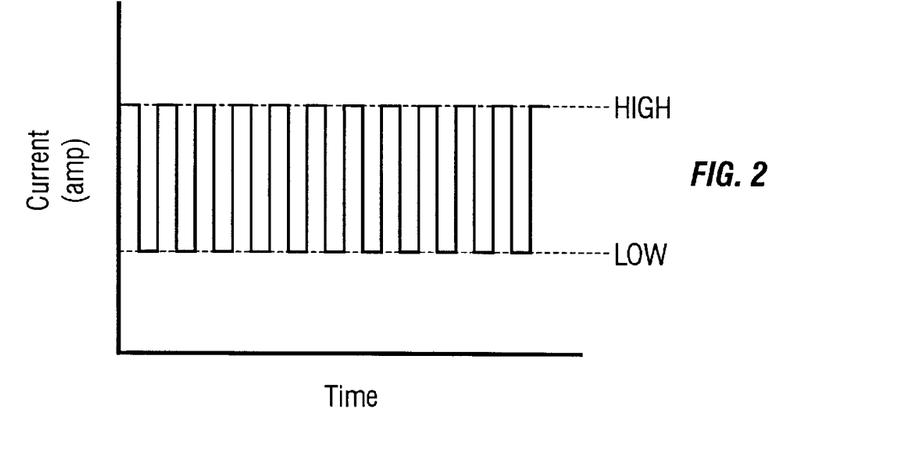
FIG. 2 illustrates a current versus time graph used in the apparatus shown in FIG. 1.

FIG. 2 illustrates a graph of the current versus time used in one embodiment. The current supplied to the electrode 28 and the substrate 25 is pulsed between a low pulse current level and a high pulse current level. Preferably, the current is pulsed at a rate of at least 20 cycles per second. The low pulse current is in the range of about 30 amps to about 100 amps, and the high pulse current is in the range of about 80 amps to about 250 amps.

Figure 3:
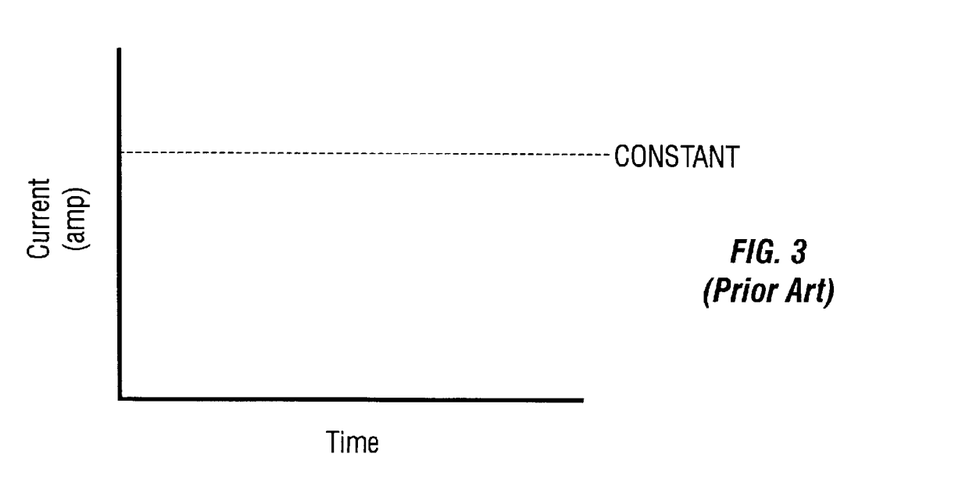
FIG. 3 illustrates a current versus time graph of the prior art.

In contrast, a conventional prior art plasma-transferred arc process utilizes a constant current between the electrode and the work piece, as illustrated in FIG. 3. In the prior art plasma-transferred arc process, a constant current level was selected to create a plasma plume between the electrode and the work piece. This current level usually is high enough to dissolve a substantial portion of the carbide in the hardfacing material and to cause the metal substrate to melt and diffuse into the hardfacing material. The dissolution of carbide and dilution by the substrate metal may adversely affect the wear resistance and erosion resistance of the hardfacing coating.

Dilution of a hardfacing material by a substrate metal may be indicated by "dilution rate", which is defined as the weight percentage of substrate metal which has diffused into the hardfacing material. Because the formation of a weld pool is reduced or minimized in embodiments of the invention, the dilution rate of the hardfacing coating by substrate metal typically is in the range of about 1–10%.

In the embodiments of the invention, the energy input, typically in the range of 1–6 kW, is lower than a conventional plasma-transferred arc process because the current is pulsed. This relatively low energy input results in lower temperatures in the plasma column so that the carbides in the hardfacing material are not melted or dissolved to a significant extent. Furthermore, the finer carbide particles, which may be beneficial to erosion protection, remain in the hardfacing coating.

In some preferred embodiments, a plasma column is established between the electrode and an area with a width greater than 1/8 inch of the work piece; thus, a large area of the work piece may be coated by each pass. Some applications require hardfacing coatings in a relatively large area of a metallic substrate. It should, however, be understood that it also is possible to narrow the plasma column to hardface an area with a width less than 1/8 inch. The thickness of the hardfacing coatings generally are at least 0.020 inch, with a preferred range of about 0.030 to about 0.300 inch. It should, however, be understood that almost any thickness may be obtained by the embodiments of the invention.

The hardfacing material used in embodiments of the invention generally includes a metallic component and a non-metallic component. The metallic component can be any suitable metal or combination of an alloy of metal, such as iron, steel, nickel-based alloys, and the like. In addition, the metallic component also may include silicon, aluminum, boron, and a small amount of refractory metals (such as tungsten, molybdenum, tantalum, or other transition metals). The non-metallic component generally includes a hard material, such as a carbide, boride, or nitride.

In some embodiments, the hardfacing material composition includes carbide as the non-metallic component and an alloy based on cobalt, iron, and/or nickel as the metallic component. The carbide may include a primary carbide composition and, optionally, a secondary carbide composition. The primary carbide composition includes one or more of sintered tungsten carbide (e.g., WC/Co), cast tungsten carbide (i.e., eutectic $WC/W_2C$), and macro-crystalline or single crystal tungsten carbide (i.e., WC). The secondary carbide composition may include one or more of vanadium carbide (VC), chromium carbide (i.e., $Cr_3C_2$, $Cr_7C_3$, or $Cr_{23}C_6$), and titanium carbide (i.e., TiC). In addition, borides, such as CrB, $TiB_2$ and $ZrB_2$, may be included if desired. In other embodiments, macro-crystalline tungsten carbide (WC) may be replaced by vanadium carbide (VC).

Generally, the carbide (including both the primary carbide and the optional secondary carbide) present in a hardfacing material composition is in the range of about 30–60% by weight, and the metallic component present is in the range of about 40–70% by weight (i.e., the balance of the composition). The average carbide particle size may range from about 15 $\mu$m to about 600 $\mu$m, with a preferred range of about 30–200 $\mu$m. The primary carbide composition is in the range of about 70–100% by weight of the carbide, and the optional carbide composition is in the range of about 0–30% by weight of the carbide. It should be noted that a hardfacing composition according to embodiments of the invention is not limited to these preferred numerical ranges; other ranges also may be used.

The hardfacing composition may be in the form of powder, i.e., carbide particles mixed with a metallic powder. Alternatively, the hardfacing composition may be in the form of tube rod (i.e., carbide particles are placed in a metallic tube). Other geometries, such as a wire, are also possible. It is to be noted that the hardfacing material may be used to hardface any metallic substrate that requires wear resistance, erosion resistance, or both.

During the hardfacing process, a hardfacing material is transformed to a hardfacing layer or coating. The term "hardfacing material" is used herein to refer to a hardfacing composition before it is applied in the hardfacing process, whereas the term "hardfacing layer" or "hardfacing coating" is used to refer to the coating deposited by the hardfacing process. Because a hardfacing coating is formed from a hardfacing material, the composition of the hardfacing coating may not be dramatically different from that of the hardfacing material. During the hardfacing process, a small percentage of carbide may dissolve in the metallic component, and substrate material may diffuse into the hardfacing coating. Some chemical reactions or alloying also might occur. Therefore, in general, the carbide content in a hardfacing coating may be lower than the corresponding hardfacing material. Moreover, the carbide particle size in the hardfacing coating may be smaller than that of the hardfacing material.

Figure 4A:
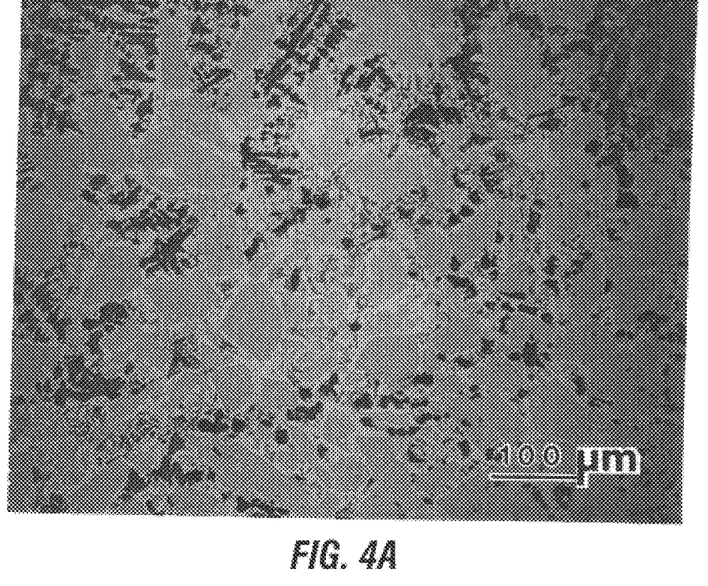
FIG. 4A is one photomicrograph at 160 magnification of a hardfacing material deposited in accordance with an embodiment of the invention.
Figure 4B:
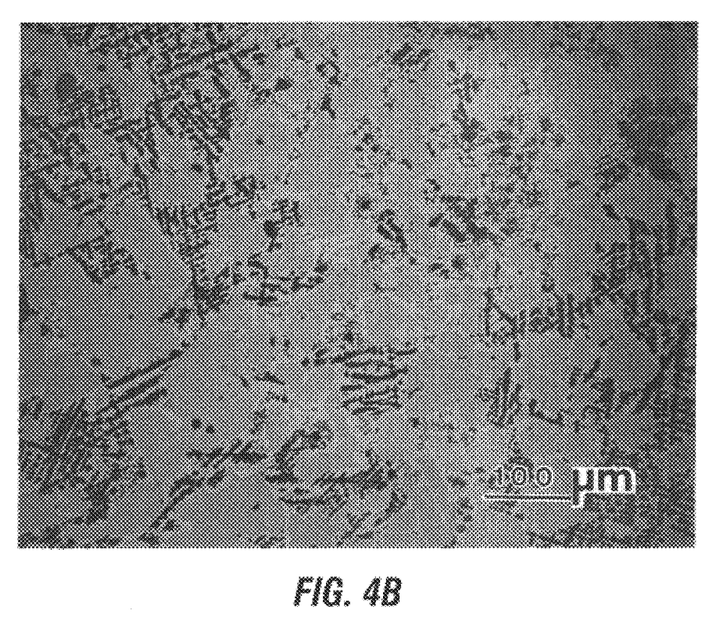
FIG. 4B is another photomicrograph at 160 magnification of a hardfacing material deposited in accordance with an embodiment of the invention.

The hardfacing coating deposited by the embodiments of the invention has the following specific properties. The hardfacing coating includes two phases: a carbide phase and a binder matrix. Preferably, the carbide phase is uniformly dispersed in the binder matrix, which is continuous. FIGS. 4A and 4B illustrate the microstructure of a hardfacing coating obtained in one embodiment. The photomicrographs indicate a particulate phase uniformly dispersed throughout a continuous matrix. Analysis indicates that the particles are the carbide phase and the continuous matrix is the binder matrix.

The volume occupied by the carbide phase generally is in the range of about 30–65%, with a preferred range of about 30–60%. The carbide phase includes a primary carbide and, optionally, a secondary carbide. The primary carbide content falls within the range of about 70–100% by volume of the carbide phase. The primary carbide includes one or more of single crystal WC, eutectic $WC/W_2C$, and sintered WC/Co. The secondary carbide is the balance of the carbide phase; it is generally in the range of about 0–15% by volume of the carbide phase. The secondary carbide phase includes one or more of the following materials: VC, TiC, $Cr_3C_2$, $Cr_7C_3$, and $Cr_{23}C_6$. As indicated in FIGS. 4A and 4B, the shape of the carbide phase may be angular, irregular, rounded, or spherical. The size of the carbide phase generally is within the range of about 15–600 $\mu$m with a preferred range of about 30–200 $\mu$m.

The volume of the binder matrix, being the balance of the hardfacing coating, is generally in the range of about 35–70%. The binder matrix includes a metallic component and non-metallic component. The metallic component may contain cobalt, nickel, iron, or mixtures or alloys thereof. It may further include silicon, aluminum, boron, and/or a small amount of refractory metals (such as tungsten, molybdenum, tantalum, or other transition metals). The non-metallic component includes a secondary carbide and a boride. The total volume content of non-metallic component in the binder matrix is between about 7–42% with a preferred range of about 8–30%. The secondary carbides may include one or more of VC, TiC, $Cr_3C_2$, $Cr_7C_3$, and $Cr_{23}C_6$. The borides may include one or more of CrB, $TiB_2$, and $ZrB_2$. The particle size of the secondary carbides and the borides is between about 10–50 $\mu$m. The shape of the particles may be angular, irregular, rounded, or spherical. The non-metallic component may include an Eta phase and a trace amount of oxides, which are a by-product of the welding process. Eta phase is a carbide phase of the formula $W_3M_3C$ or $W_6M_6C$, where M is Fe, Co, or Ni. The particle size of the Eta phase generally is less than 20 $\mu$m, and the particle shape can be crystal-like, irregular, or dendritic. The Eta phase generally is formed during the hardfacing process.

Another embodiment of the invention relates to automating the placement of hardfacing material onto the cone surfaces. This is particularly important when hardfacing material is applied to the cone surface in intricate patterns between the inserts. In preferred embodiments, insert holes are drilled after the cones have been hardfaced. Therefore, it is important that deposition of the hardfacing material not interfere with the subsequent insert hole-drilling operation. One method of automation is to use numerically controlled ("NC") or computer numerically controlled ("CNC") machines to move the plasma torch to place the hardfacing material directly onto predetermined areas of the cone cutter which are susceptible to erosion. The machines can be programmed using any conventional computer-aided manufacturing techniques to place the hardfacing material sufficiently away from where the insert holes will be drilled. Alternatively, NC or CNC machines may be used to move the cone relative to a plasma torch.

When a hardfacing material is placed on the cone surface between areas which will become insert holes, a "start" mark on the cone may be necessary to ensure proper setup for the hole-drilling process to be synchronized with the hardfacing process. Other suitable methods to ensure a proper zero or circumferential starting location also may be used. A small start hole in the cone which interfaces with a tooling fixture zero point is one possible method. Another acceptable method is to use a machine with index plates which are timed to be in phase with the subsequent hole-drilling operation. The machine then may be set up to place hardfacing material onto the cone surface and automatically index to the next circumferential location. This allows insert holes to be drilled in the intended areas. A "start" mark may be required for proper setup of the subsequent insert hole-drilling operation.

In some embodiments, only circumferential bands of hardfacing material in the cone grooves adjacent to the insert lands are deposited. It is entirely possible to do this by a robot. Manufacturing parameters such as speed and feed rate may be optimized to achieve the desired hardfacing thickness and consistency.

The following examples illustrate embodiments of the invention and are not restrictive of the invention as otherwise described herein.

EXAMPLE 1

This example demonstrates that embodiments of the invention are capable of producing hardfacing coatings with satisfactory wear resistance. In this example, all hardfacing compositions were fed in the form of powder through a pulsed-PTA torch into a plasma column. All hardfacing powders included a carbide in the form of particles mixed with a powdered metal matrix material (i.e., the metallic component). The metal matrix material included alloys of iron, nickel, or cobalt designated by AISI 316, AISI 304, AISI 309, AISI 410, 17-4 PH, Stellite 21, Ultimet, and BNi-2. The composition of these metal matrix materials in terms of weight percentage are listed in Table 1, and their powders were produced by an argon atomizing process.

TABLE 1

Composition of Metal Matrix Material (wt. %)

| Composition | C | B | Si | Cr | Cu | Mo | W | Ni | Co | Fe |
|---|---|---|---|---|---|---|---|---|---|---|
| AISI 316 | 0.02 | 0 | 0 | 17 | 0 | 2.5 | 0 | 11 | 0 | 69.48 |
| AISI 304 | 0.02 | 0 | 0 | 19 | 0 | 0 | 0 | 10 | 0 | 70.98 |
| AISI 309 | 0.04 | 0 | 0 | 23 | 0 | 0 | 0 | 13 | 0 | 63.96 |
| AISI 410 | 0.10 | 0 | 0 | 12.5 | 0 | 0 | 0 | 0 | 0 | 87.4 |
| 17-4 PH | 0.07 | 0 | 0 | 15.4 | 4.4 | 0 | 0 | 4.5 | 0 | 75.63 |
| Stellite 21 | 0.25 | 0 | 0 | 27 | 0 | 6 | 0 | 1.5 | 65.25 | 0 |
| Ultimet | 0.06 | 0 | 0 | 26 | 0 | 5 | 2 | 9 | 54.94 | 3 |
| BNi-2 | 0.06 | 3.12 | 4.5 | 7 | 0 | 0 | 0 | 84.82 | 0 | 0.5 |

In addition, vanadium steel also was used as a metal matrix material. It typically includes about 74% iron, 3.4% carbon, 0.5% manganese, 0.9% silicon, 5.2% chromium, 14.5% vanadium, 1.3% molybdenum, and 0.1% sulfur.

Fourteen hardfacing powder samples were made according to Table 2.

TABLE 2

Composition of Hardfacing Powder Samples (wt. %)

| Sample No. | WC/Co | WC/W$_2$C | VC | Si/Mn | Matrix Wt. % | Matrix Material |
|---|---|---|---|---|---|---|
| 1 | 26 | 30 | 4 | 3 | 37 | AISI 316 |
| 2 | 26 | 30 | 4 | 3 | 37 | AISI 304 |
| 3 | 26 | 30 | 4 | 3 | 37 | AISI 309 |
| 4 | 26 | 30 | 4 | 3 | 37 | AISI 17-4-PH |
| 5 | 40 | 13 | 4 | 3 | 40 | AISI 17-4-PH |
| 6 | 26 | 30 | 4 | 3 | 37 | AISI 410 |
| 7 | 40 | 13 | 4 | 3 | 40 | AISI 410 |
| 8 | 40 | 13 | 6 | 3 | 38 | AIS1 410 |
| 9 | 41 | 16 | 4 | 0 | 38 | BNi-2 |
| 10 | 40 | 15.8 | 3.7 | 3 | 37.5 | BNi-2 |
| 11 | 40 | 16 | 4 | 0 | 40 | Stellite 21 |
| 12 | 35 | 18 | 4 | 3 | 40 | Stellite 21 |
| 13 | 40 | 13 | 4 | 3 | 40 | Ultimet |
| 14 | 40 | 13 | 4 | 3 | 40 | Vanadium Steel |

In addition, a fifteenth sample was made for use in a manual oxyacetylene hardfacing process. This sample contained about 42% WC/Co particles in the size range of from about 420 to 590 μm, 12% WC/W$_2$C, 6% WC, and an AISI 1008 steel tube rod as the balance. The sample was made for use as a baseline for comparison.

Fourteen hardfacing coatings were obtained by the pulsed-PTA method from Samples No. 1–14. The fifteenth hardfacing coating was made by a manual oxyacetylene welding process from Sample No. 15. All the hardfacing coatings subsequently were subjected to a low stress abrasion test and a high stress abrasion test. The low stress abrasion test was conducted in accordance to ASTM G65, and the high stress abrasion test was conducted in accordance to ASTM B611.

Briefly, in the ASTM G65 test, abrasive particles, e.g., semi-rounded 50/70 mesh (210/300 μm) silica sand, were fed between a test material (such as the hardfacing coating) and a rotating chlorobutyl rubber wheel. The test material was pressed against the rotating wheel at a specific force of 130 N (30 pounds). The rotating speed of the wheel was about 200±10 rpm, and the sand flow rate was about 380 to 430 g/min. The weight loss of the test material was measured by weighing each sample before and after a 6000 revolution test and then converted to volume loss (in cubic millimeters per 1000 revolutions). The smaller the wear number is, the better wear resistance the material has. The stress exerted on the abrasive particles was low enough to not crush the abrasive particles in this test.

In the ASTM B611, the abrasive particles used in the test were 30 mesh (590 $\mu$m) angular aluminum-titanium oxide. They were fed and crushed between an annealed AISI 1020 steel wheel and the test material. Some degree of impact on the test material was encountered. The abrasive particles in the slurry were fed between the test material and the wheel by the rotating wheel at 100±10 rpm. The test material was pressed against the rotating wheel with a 20 kg force for 1000 revolutions. A wear number was obtained and expressed as the reciprocal of the volume loss (in cubic millimeter) of the test material per revolution. In this test, the larger the number is, the better the wear resistance is.

The testing results for the fifteen hardfacing coatings are summarized in the following Table 3.

TABLE 3

Wear Resistance of Hardfacing Coatings

| Hardfacing Coating Number | Low Stress Abrasion Wear Number | High Stress Abrasion Wear Number |
|---|---|---|
| 1 | 1.7–1.9 | 2.2 |
| 2 | 1.3–1.7 | 1.5–2.2 |
| 3 | 1.8 | 2.3 |
| 4 | 2.1–2.3 | 1.9–2.0 |
| 5 | 2.1 | 2.5 |
| 6 | 2.0 | 2.7 |
| 7 | 1.8 | 3.0 |
| 8 | 2.0 | 2.4 |
| 9 | 2.3–2.9 | 2.0–2.3 |
| 10 | 2.2 | 2.0–3.1 |
| 11 | 1.4 | 3.3 |
| 12 | 1.5 | 2.8 |
| 13 | 2.0 | 2.4 |
| 14 | 1.6 | 2.5 |
| 15 | 1.8–2.0 | 2.6–3.0 |

It is to be noted that Hardfacing Coating No. 15, as produced by a manual oxyacetylene welding process, has been used in commercial products and serves as a baseline for comparison. The above table indicates that Hardfacing Coatings No. 7 and No. 14 have low-stress wear numbers and high-stress wear numbers similar to Hardfacing Coating No. 15. On the other hand, Hardfacing Coatings No. 11 and No. 12 exceeded the performance of Hardfacing Coating No. 15.

EXAMPLE 2

This example shows that hardfacing coatings deposited by embodiments of the invention have higher carbide contents, more uniform distribution of carbide particles, and lower substrate dilution than those by a non-pulsed plasma-transferred arc process.

Two hardfacing samples were prepared on a AISI 4815 steel substrate: one by a pulsed plasma-transferred arc method in accordance to an embodiment of the invention ("pulsed-PTA hardfacing") and another by a plasma-transferred arc method of prior art ("PTA hardfacing"). Both hardfacings were deposited in the following manner.

A powder mixture designated as "HM 22" was used as the hardfacing composition. The powder mixture included about 22.3% by weight of sintered WC/Co pellets, 28.7% by weight of spherical cast WC-W$_2$C, 12.8% by weight of macro-crystalline WC, and the balance 410 stainless steel. The particle size of the sintered WC/Co pellets was in the range of about 74 to 297 $\mu$m, the spherical cast WC/W$_2$C was about 74 to 149 $\mu$m, and the macro-crystalline WC was about 44 to 74 $\mu$m.

For the PTA hardfacing, the powder mixture was fed into a plasma column at a rate of about 40 g/min. The voltage and current used were about 26 volts and 115 amps, respectively.

For the pulsed-PTA hardfacing, the powder mixture also was fed into a plasma column at a rate of about 40 g/min. The voltage was about 26 volts. The high pulse current was about 115 amps and the low pulse current was about 80 amps. The current was pulsed at a pulse rate of about 100 cycles per second with about 65% duration time at the high pulse current.

Figure 5:
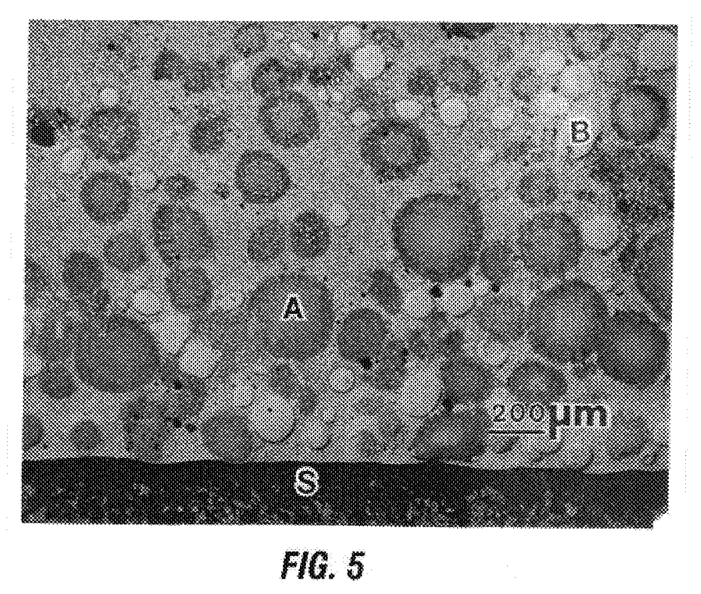
FIG. 5 is a photomicrograph at 50 magnification of a hardfacing material deposited by a pulsed plasma-transferred arc process in accordance with an embodiment of the invention.
Figure 6:
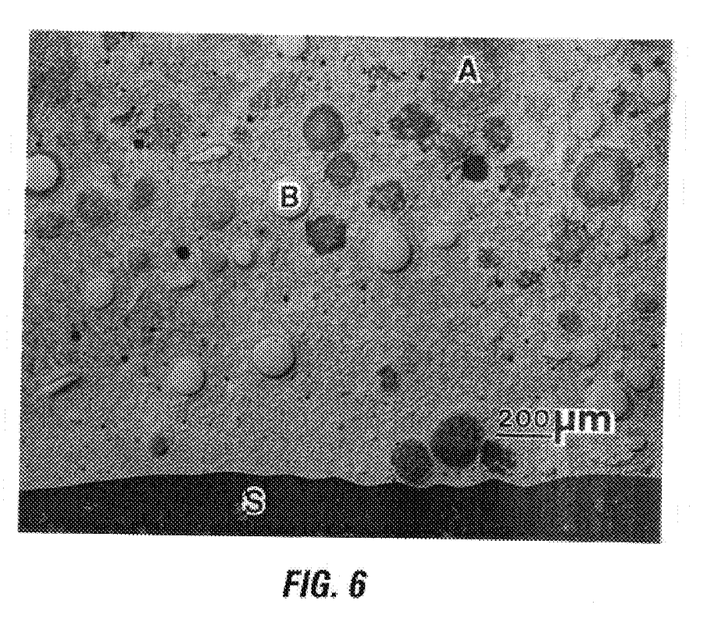
FIG. 6 is a photomicrograph at 50 magnification of a hardfacing material deposited by a plasma-transferred arc process in accordance with a prior art method.

After both samples were obtained, photomicrographs were taken at a cross-section of the hardfacing and steel substrate. FIG. 5 is a cross-sectional view of the pulsed-PTA hardfacing on a steel substrate. FIG. 6 is a cross-sectional view of the PTA hardfacing on a steel substrate. In both figures, the steel substrate is labeled as "S," the sintered WC-Co pellets are labeled as "A," and the spherical cast WC-W$_2$C pellets are labeled as "B."

Perusal of the figures reveals several microstructural differences between the pulsed-PTA hardfacing and the PTA hardfacing. First, there are more sintered WC-Co and WC-W$_2$C pellets in the pulsed-PTA hardfacing than the PTA hardfacing. Secondly, the carbide particles are larger and more uniformly distributed in the pulsed-PTA hardfacing than the PTA hardfacing. Moreover, the interface between the substrate and the hardfacing coating for the pulsed-PTA hardfacing is less corrugated or wavy than for the PTA hardfacing. The corrugation is believed to be associated with melting of the substrate metal. Upon melting, portions of the substrate metal may diffuse into the hardfacing coating during the deposition process, resulting in substrate dilution. Less corrugation generally indicates less substrate melting and lower substrate dilution of the hardfacing coating.

It should be noted that dilution of the substrate metal usually occurs in hardfacing and welding as a result of the high energy input of a plasma process. Due to the high energy, an area of the substrate melts. The molten metal in this area may alloy with the hardfacing material and then re-solidify. This area is called "diluted area." As mentioned above, a dilution rate is defined as the weight percentage of substrate metal which has difffised into the hardfacing coating. Alternatively, it may be defined as the percentage of the diluted area over the total area exposed to a hardfacing process. It may be measured by examining a cross-section of the hardfacing coating and the substrate in an optical microscope. In this example, the dilution rate as measured by optical microscopy for the PTA process was about 21.4%, whereas the dilution rate for the pulsed-PTA was in the range of about 1.7–5.8%.

EXAMPLE 3

To measure the erosion resistance of hardfacing coatings deposited in accordance with the above embodiments, a slurry jet erosion test was conducted on three samples. Samples No. 1–4 were made in accordance with the above embodiments, whereas Sample No. 5 was prepared by a super-D gun process as described in U.S. Pat. No. 5,535,838.

Sample No. 1 included a coating deposited using tube rod designated as "70 M" by a pulsed plasma-transferred arc process in accordance with embodiments of the invention. The 70 M tube rod contained about 65% by weight of macro-crystalline WC with particle size in the range of about 75 to 177 μm and 35% by weight of steel of the AISI 1008 type. The macro-crystalline WC particles were primarily triangular pellets.

Sample No. 2 included a coating deposited using tube rod designated as "HM 16" by a pulsed plasma-transferred arc process in accordance with the above embodiments. The HM 16 tube rod contained 44.7% by weight of spherical sintered WC-Co pellets with particle size of about 420 to 600 μm, 12.8% by weight of spherical cast WC/W$_2$C with particle size of about 74 to 149 μm, 6.4% by weight of single crystal WC with particle size of about 30 μm, and AISI 1008 steel as the balance.

Sample No. 3 included a coating deposited using tube rod designated as "HM-18VM" by a pulsed plasma-transferred arc process in accordance with the above embodiments. The HM-18VM tube rod contained about 23.3% by weight of sintered WC-Co pellets with particle size of about 74 to 297 μm, about 30% by weight of cast spherical WC/W$_2$C with particle size of about 74 to 149 μm, 6.7% by weight of VC with particle size of about 20 μm, and AISI 1008 steel as the balance.

Sample No. 4 included a coating deposited using tube rod designated as "ST-70S" by a pulsed plasma-transferred arc process in accordance with the above embodiments. The ST-70S tube rod contained about 68.4% by weight of cast spherical WC/W$_2$C with particle size of about 74 to 177 μm, and AISI 1008 steel as the balance.

The resulting hardfacing coating deposited from the HM 16 tube rod contained about 32% by volume sintered WC/Co, 9% by volume of spherical cast WC/W$_2$C and 5% by volume single-crystal WC, and a steel matrix as the balance. The particle size of the sintered WC/Co was in the range of about 420 to 600 μm. The spherical cast WC/W$_2$C had a particle size of about 75 to 149 μm. Both had a spherical shape. Furthermore, the particle size of the single-crystal WC was in the range of about 10 to 30 μm. The deposition conditions for Sample No. 1 and Sample No. 2 are summarized in Table 4.

TABLE 4

Deposition Conditions for Samples No. 1 and No. 2

| | Sample No. 1 | Sample No. 2 |
|---|---|---|
| Hardfacing Material | 70 M | HM 16 |
| Substrate Geometry | Disk | Disk |
| | 4" diameter | 4" diameter |
| | 2½" thickness | 2½" thickness |
| Substrate Alloy | AISI 4815 | AISI 4815 |
| Voltage (Volt) | 28 | 27.5 |
| Material Feed Rate (g/min) | 10 | 10 |
| Shield Gas Flow Rate (cfh) | 20 | 20 |
| Current Gas Flow Rate (cfh) | 4.5 | 5 |
| Pulse Rate (cps) | 100 | 100 |
| High Pulse Current (A) | 85 | 80 |
| Low Pulse Current (A) | 47 | 40 |
| Thickness (inch) | 0.060 | 0.060 |
| Carbide Content (volume %) | 50 | 46 |

Samples No. 3 and No. 4 were deposited under similar conditions. All of the above samples were tested in a slurry jet erosion test, along with a sample of carburized AISI 4815 steel.

The slurry jet erosion test is a fluid erosion test in which a hardfacing coating is subjected to impingement of a stream of abrasive grit. The amount of material removed during the test, which is indicative of erosion rate, is calculated in terms of inches per hour. The erosion rate generally correlates with erosion performance of the hardfacing in drilling applications.

In this example, the test apparatus included a mud pump, a 12¼" bit body with a hardfacing sample to be tested, and two ¹⁶⁄₃₂" 97 series nozzles. The abrasive grit was drilling mud with 0.5% US silica F110 sand with a particle size of about 70–110 μm. The nozzle stand off distance was approximately 1" and the angle of impingement was about 11 degrees. The flow rate of the drilling mud was about 350 feet per second. The test duration varied from 15 to 30 minutes, depending on the material tested. The erosion rate was normalized against a standard tungsten carbide coupon designated as "Matrix P-90". A representative composition for Matrix P-90 includes about 64% macro-crystalline WC, about 33% cast tungsten carbide, about 1% nickel, and about 2% iron. Table 2 shows different erosion rates for the four samples.

TABLE 5

Erosion Rate of Hardfacing Samples

| Coating | Carbide Content (wt. %) | Erosion Rate (in/hr) |
|---|---|---|
| Sample No. 1 (70 M) | 50 | 0.0003 |
| Sample No. 2 (HM 16) | 46 | 0.0002 |
| Sample No. 3 (HM-18VM) | 49 | 0.0003 |
| Sample No. 4 (ST-70S) | 52 | 0.0001 |
| Sample No. 5 (Super D-Gun) | 80 | 0.0004 |
| Carburized AISI 4815 Steel | 0 | 0.0115 |

The data show that the hardfacing coatings deposited by the pulsed plasma-transferred arc process according to the above embodiments have better erosion resistance than the one made by a super D-gun process, although the super D-gun process produces a good, wear-resistant hardfacing. It is surprising that Sample No. 1, which includes only 50% carbide, is more erosion resistant than Sample No. 5 (made by a super D-gun process, which contains 80% carbide). It is further noted that Sample No. 4 is more erosion resistant than Sample No. 1, although they include a similar amount of carbide. This indicates that the type and shape of tungsten carbide in a hardfacing coating may have a significant influence on its erosion properties.

EXAMPLE 4

Figure 7:
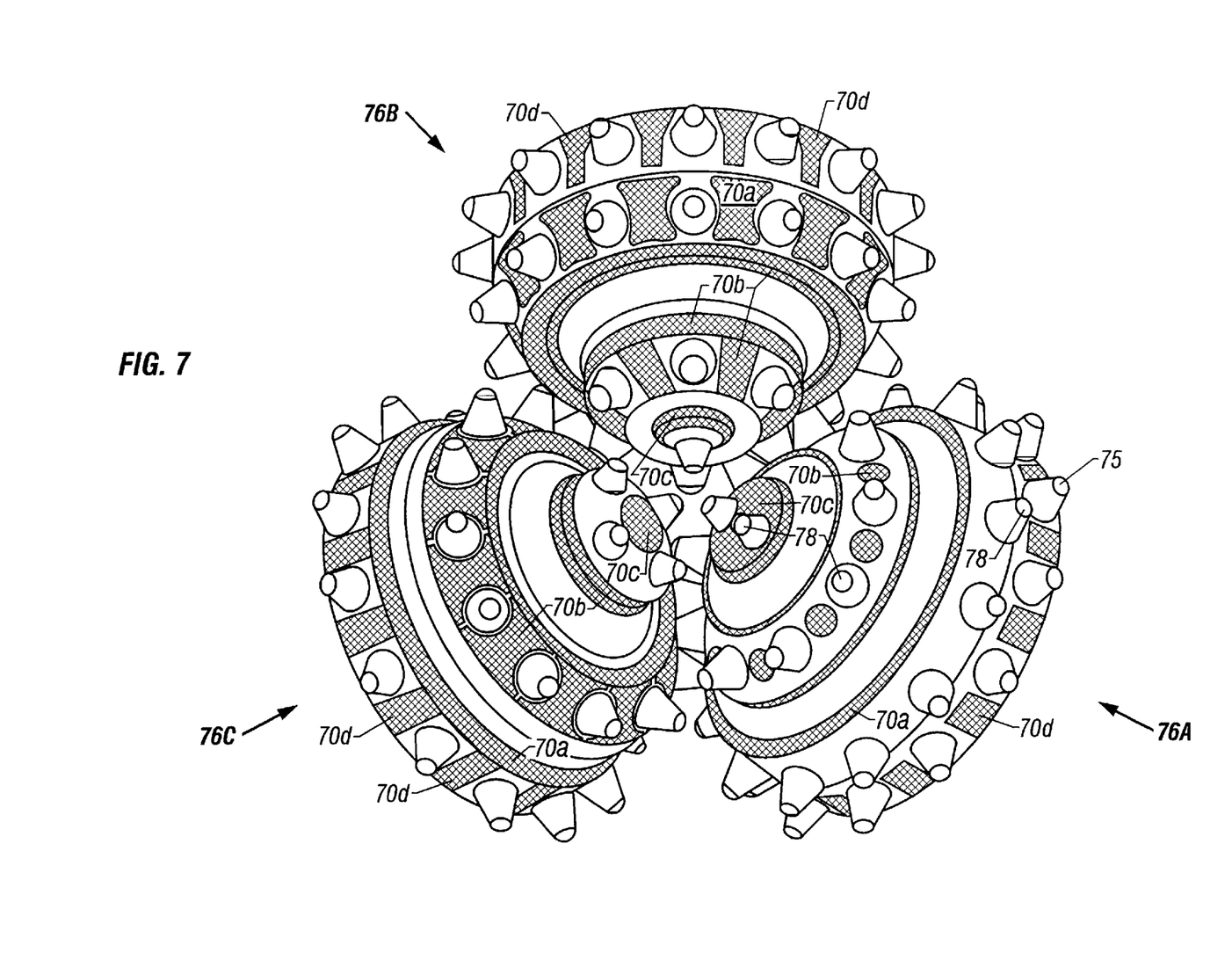
FIG. 7 is an isometric view of a tungsten carbide insert rock bit with a layer of hardfacing material in accordance with one embodiment of the invention.

This example shows how a rock bit with roller cones could be hardfaced in accordance with the present embodiments. FIG. 7 illustrates three roller cones of a rock bit overlaid with hardfacing material according to one of the above embodiments. The three roller cones are labeled as 76A, 76B and 76C. Although the insert configuration on one cone is different from that of another in FIG. 7, it is entirely acceptable to manufacture a rock bit with three identical cones. There are gage row inserts 75 and inner row inserts 78. These inserts are circumferentially spaced around the surface of the cone. Generally, there is more than one row of inner row inserts. Additionally, there are heel row inserts (not shown) located on the heel surface (not shown) of the cone. Much of the erosion of cones typically occurs between the gage row inserts 75 and the heel row inserts (not shown). Furthermore, erosion may also occur at the lands between the gage row inserts and the lands between inner row inserts 78. It is also possible that erosion may occur in the grooves between successive inner row inserts 78. These areas on a cutter cone surface are collectively referred to as "area susceptible to erosion or wear". It should be understood that the term "area susceptible to erosion or wear" means any area on a roller cone that experiences significant erosion or wear when in use. It may also mean an area of a rock bit that experiences significant erosion or wear when in use. Such areas include, for example, the shirttail and the journal of a rock bit and the piston of a percussion bit.

As illustrated by FIG. 7, a layer of hardfacing material deposited on different areas of the cone is represented by 70*a*, 70*b*, 70*c*, and 70*d*. Layers 70*a*, 70*b*, 70*c*, and 70*d* may be of the same or different hardfacing materials, depending upon the design of the rock bit. These layers are deposited on selected lands and grooves of the cutter cone surfaces. It should be understood that, in some applications, it is sufficient to coat only the lands or the grooves of a cutter cone surface. Preferably, the boundaries of a hardfacing coating is at least 1/16 inch away from the insert holes so that the hardfacing coating does not affect the subsequent placement of inserts in the holes by interference fit.

Moreover, a hardfacing coating may take various shapes. For example, they include, but are not limited to, round, circular, elliptical, square, rectangular, trapezoidal, oblong, arched, triangular, annular, and any irregular shape. In the case where hardfacing is desired only in the grooves of a cutter cone surface, it is advantageous to deposit a continuous circumferential ring in the grooves.

In addition to roller cones surfaces, the shirttails, the journals, and the pistons of a rock bit may be hardfaced by the pulsed plasma transferred arc process. In fact, any wear component of a rock bit may be hardfaced in this manner.

EXAMPLE 5

This example illustrates that the pulsed plasma-transferred arc process according to the above embodiments may also be applied to hardface milled tooth rock bits.

Figure 8:
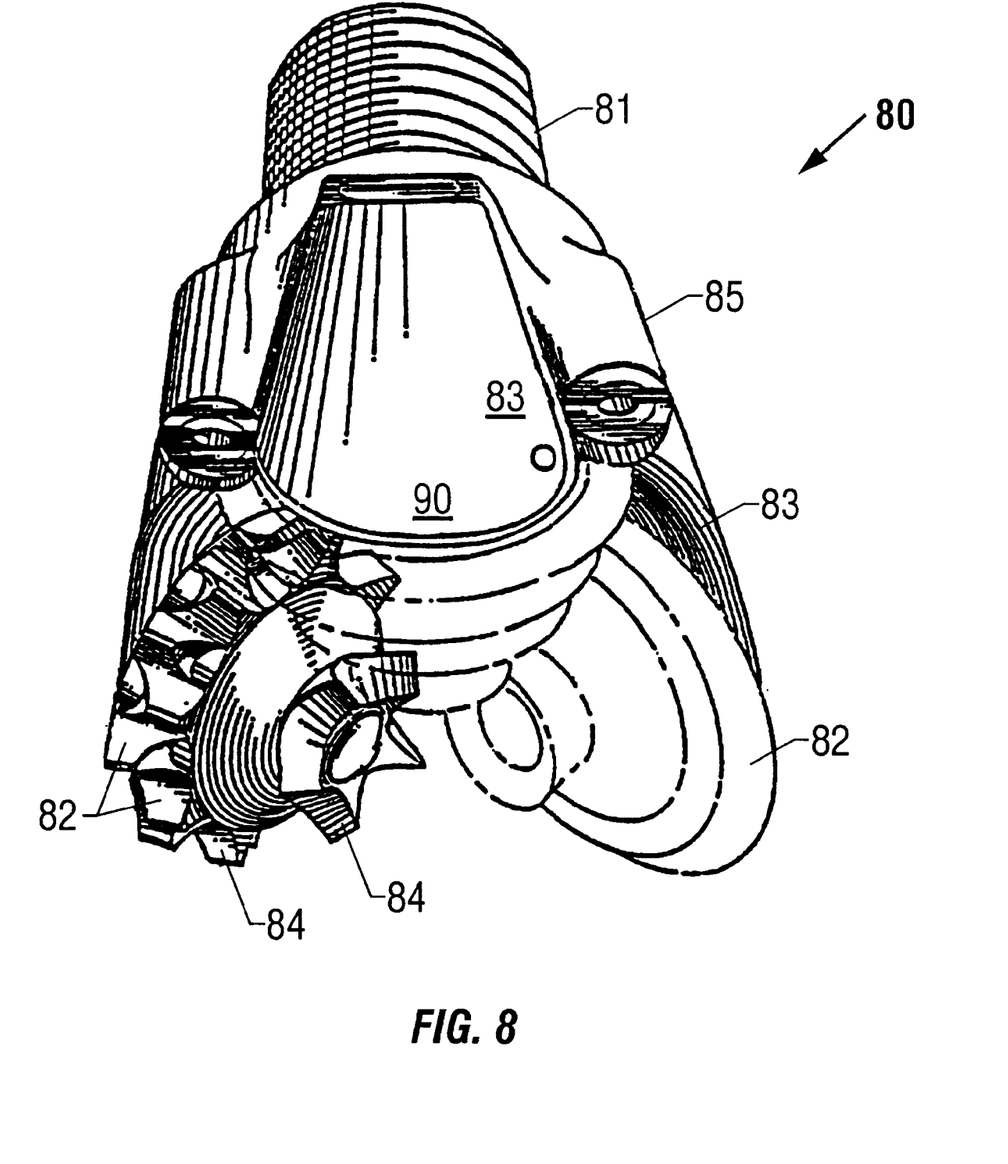
FIG. 8 is a perspective view of a typical milled tooth rock bit.

FIG. 8 illustrates a typical milled tooth rock bit 80. It includes a steel body 85 having a threaded pin 81 at one end for connection to a conventional drill string. At the opposite side of the body, there are three roller cones 82. Each roller cone is rotatably mounted on a pin or journal (hidden) extending diagonally inwardly from one of the three legs 83 which extend downwardly from the body of the rock bit. Typical teeth 84 on such a cone are generally triangular in a cross-section taken in a plane perpendicular to the axis of rotation of the cone.

Figure 9:
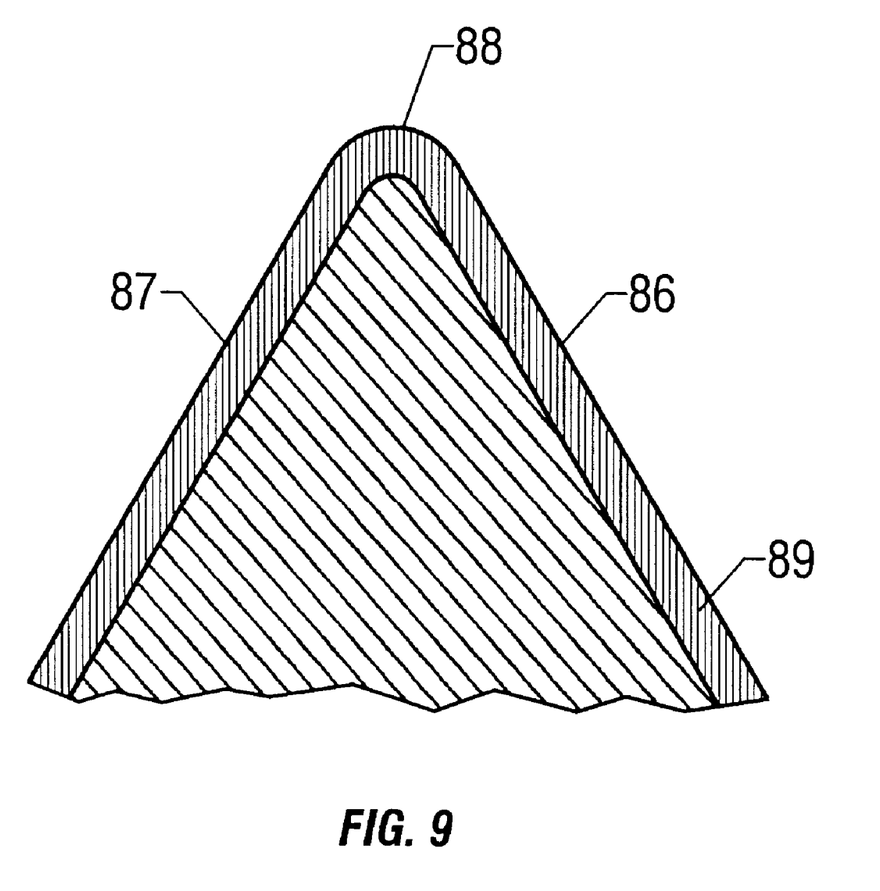
FIG. 9 is a cross-sectional view of a milled tooth coated with a layer of hardfacing material in accordance with an embodiment of the invention.

FIG. 9 is a cross-sectional view of a tooth coated with a hardfacing material according to the above embodiments. Such a tooth has a leading flank 86 and a trailing flank 87 meeting in an elongated crest 88. The flanks of the teeth are covered with a hardfacing coating 89. Sometimes only the leading face of each tooth is covered with a hardfacing coating to create a self-sharpening effect. This effect is due to the differential erosion between the more wear resistant hardfacing on the leading face and the less wear resistant steel on the trailing face, and such differential erosion tends to keep the crest of the tooth relatively sharp. There also are times when the ends (i.e., the faces between the leading flank face and the trailing flank face) of a tooth are coated with a layer of hardfacing.

Hardfacing is especially desirable in areas which are referred to as the gage surface. The gage surface generally is the flat surface at the heel of the cone which engages the sidewall of the wellbore as the bit is used. The gage surface includes the outer end of teeth 84 in the gage row of the teeth nearest the heel of the cone and may include additional areas nearer the axis of the cone than the root between the teeth. These areas are collectively referred to as "area susceptible to erosion or wear" for milled tooth rock bits. Again, the term "area susceptible to erosion or wear" means any area on a milled-tooth cone that experiences significant erosion or wear when in use.

In addition to milled-tooth cones, the piston and the journal of a milled-tooth cone rock bit also may be hardfaced. These components are exposed to frictional contact wear and abrasion wear in use.

As demonstrated above, the above embodiments are capable of producing erosion-resistant and wear-resistant hardfacing coatings on a metallic work piece. They are especially effective in producing hardfacing coatings on milled tooth rock bits and tungsten carbide insert rock bits. The hardfacing coatings may have higher carbide contents and lower substrate dilution. Furthermore, there may be stronger metallurgical bonding between the hardfacing coatings and the metallic substrate. Such coatings exhibited good wear and erosion resistance.

While the invention has been disclosed with respect to a limited number of embodiments, numerous modifications and variations therefrom exist. For example, the hardfacing material may include any suitable materials for wear resistance and erosion resistance applications. Such materials may include hard metals, metal alloys, carbides, borides, nitrides, diamond grit, and diamond-like carbon. Although the hardfacing material was introduced into the plasma column in the form of powder, other forms, such as wire and tube rod, also are feasible. It should be understood that the invention is equally applicable to any other arc processes that can be pulsed, including, for example, the metal inert gas welding process. Furthermore, the invention also can be used to apply a hardfacing coating on any wear component of an earth-boring device, such as the surface of the steel body of a polycrystalline diamond compact insert-type drill bit and drill hammer head pistons in percussion bits. While single-crystal WC, eutectic $WC/W_2C$, and sintered WC/Co are preferred as the primary carbide, it should be understood that any hard carbide may be used in place of single-crystal WC, eutectic $WC/W_2C$ or sintered WC/Co. Such carbides may include, for example, titanium carbide and chromium carbide. Furthermore, it is also conceivable that a third carbide phase may further enhance erosion and wear protection. Such a tertiary carbide may include any hard carbide material. Finally, the invention can be practiced in an order different from that described above. It is intended that the appended claims cover all such modifications and variations as fall within the true spirit and scope of the invention.

What is claimed is:

1. A method of depositing a hardfacing material on a metal substrate, comprising:

forming a plasma column immediately adjacent to an area of a metal substrate;

feeding a hardfacing material into the plasma column;

pulsing an electrical current at a pulse rate; and controlling the pulsing of the electrical current from a lower value large enough to enable melting at least one component of the hardfacing material and a higher value selected to minimize the formation of a weld pool in the area, wherein a hardfacing coating is deposited in the area of the metal substrate.

2. The method of claim 1, further comprising:
pre-heating the metal substrate to a temperature of at least 250° F.

3. The method of claim 1, wherein the act of controlling the pulsing of the electrical current includes controlling the pulse rate.

4. The method of claim 1, wherein the electrical current is pulsed between a pre-determined high pulse current and a pre-determined low pulse current.

5. The method of claim 4, wherein the act of controlling the pulsing of the electrical current includes controlling the pre-determined high pulse current.

6. The method of claim 4, wherein the act of controlling the pulsing of the electrical current includes controlling the pulse rate and the pre-determined high pulse current.

7. The method of claim 4, wherein the pre-determined low pulse current is selected to be high enough to melt at least one component of the hardfacing material.

8. The method of claim 1, wherein the lower value is in the range of about 30–100 amps.

9. The method of claim 1 wherein the higher value is in the range of about 80–250 amps.

10. The method of claim 3, wherein the pulse rate is at least 20 cycles per second.

11. The method of claim 1, wherein the hardfacing coating has a thickness of at least 0.020 inch.

12. The method of claim 1, wherein the hardfacing coating has a thickness in the range from about 0.030 to about 0.300 inch.

13. The method of claim 1, wherein the dilution rate of the hardfacing coating by the substrate is in the range of about 1–10%.

14. The method of claim 1, wherein the metal substrate is moved relative to the plasma column to deposit a band of the hardfacing material on the metal substrate.

15. The method of claim 14, wherein a numerically controlled machine is used to move the metal substrate relative to the plasma column.

16. The method of claim 14, wherein a computer numerically controlled machine is used to move the metal substrate relative to the plasma column.

17. The method of claim 14, wherein a numerically controlled machine is used to move the plasma column relative to the metal substrate.

18. The method of claim 14, wherein a computer numerically controlled machine is used to move the plasma column relative to the metal substrate.

19. The method of claim 1, wherein the hardfacing material includes a metallic component and a non-metallic component.

20. The method of claim 19, wherein the metallic component includes one of nickel, cobalt, iron, and alloys thereof.

21. The method of claim 19, wherein the non-metallic component includes one of carbide, boride, and nitride.

22. The method of claim 19, wherein the non-metallic component includes a primary carbide composition.

23. The method of claim 19, wherein the non-metallic component includes a primary carbide composition and a secondary carbide composition.

24. The method of claim 22, wherein the primary carbide composition includes one of single crystal WC, eutectic $WC/W_2C$, and sintered WC/Co.

25. The method of claim 22, wherein the primary carbide composition includes one of VC, eutectic $WC/W_2C$, and sintered WC/Co.

26. The method of claim 23, wherein the secondary carbide composition includes one of VC, TiC, $Cr_3C_2$, $Cr_7C_3$, and $Cr_{23}C_6$.

27. A method of manufacturing a hardfaced roller cone, comprising:
forming a plasma column immediately adjacent to an area susceptible to erosion or wear on the roller cone;
feeding a hardfacing material into the plasma column;
pulsing an electrical current through the plasma column at a pulse rate; and
controlling the pulsing of the electrical current from a lower value large enough to enable melting at least one component of the hardfacing material to a higher value selected to minimize the formation of a weld pool in the area,
wherein a hardfacing coating is deposited in the area on the roller cone.

28. A method of manufacturing a hardfaced rock bit, the rock bit including an area susceptible to wear or erosion, the method comprising:
forming a plasma column immediately adjacent to the area;
feeding a hardfacing material into the plasma column;
pulsing an electrical current through the plasma column at a pulse rate; and
controlling the pulsing of the electrical current from a lower value large enough to enable melting at least one component of the hardfacing material to a higher value selected to minimize the formation of a weld pool in the area and to deposit a hardfacing coating in the area on the rock bit.

29. The method of claim 28, wherein the roller cone is selected from the group consisting of a milled-tooth cone and a tungsten carbide insert cone.

30. The method of claim 29, wherein the area susceptible to erosion or wear is a gage surface.

31. The method of claim 29, wherein the area susceptible to erosion or wear is a heel row surface.

32. The method of claim 29, wherein the area susceptible to erosion or wear is an inner row surface.

33. The method of claim 29, wherein the roller cone is a milled-tooth cone having a protruding tooth, and the area susceptible to erosion or wear is the tooth.

34. The method of claim 28, wherein the rock bit includes a shirttail and the area susceptible to erosion or wear is the shirttail.

35. The method of claim 28, wherein the rock bit includes a journal and the area susceptible to erosion or wear is the journal.

36. A hardfaced earth-boring device manufactured by the method comprising:
providing an earth-boring device having a metal substrate;
forming a plasma column immediately adjacent to an area on the metal substrate;
feeding a hardfacing material into the plasma column;
pulsing the electrical current through the plasma column at a pulse rate; and
controlling the pulsing of the electrical current from a lower value large enough to enable melting at least one component of the hardfacing material to a higher value selected to minimize the formation of a weld pool in the area,
wherein a hardfacing coating is deposited in the area on the metal substrate.

37. The hardfaced earth-boring device of claim 36, wherein the earth-boring device is a percussion bit having a piston, and the hardfacing coating is deposited on a surface of the piston.

38. A hardfaced roller cone manufactured by the method comprising:

providing a roller cone;

forming a plasma column immediately adjacent to an area susceptible to erosion or wear on the roller cone;

feeding a hardfacing material into the plasma column;

pulsing the electrical current through the plasma column at a pulse rate; and controlling the pulsing of the electrical current from a lower value large enough to enable melting at least one component of the hardfacing material to a higher value selected to minimize the formation of a weld pool in the area, wherein a hardfacing coating is deposited in the area on the roller cone.

39. The roller cone of claim 38, wherein the roller cone includes a tungsten carbide insert.

40. The roller cone of claim 38, wherein the roller cone includes a milled steel tooth.

41. A hardfaced rock bit manufactured by the method comprising:

providing a rock bit having a roller cone, the rock bit including an area susceptible to wear or erosion;

forming a plasma column immediately adjacent to the area;

feeding a hardfacing material into the plasma column;

pulsing the electrical current through the plasma column at a pulse rate; and controlling the pulsing of the electrical current from a lower value large enough to enable melting at least one component of the hardfacing material to a higher value selected to minimize the formation of a weld pool in the area and to deposit a hardfacing coating in the area on the rock bit.

42. The rock bit of claim 41, wherein the roller cone includes a groove, and the hardfacing coating is deposited in the groove.

43. The rock bit of claim 41, wherein the roller cone includes a land, and the hardfacing coating is deposited over the land.

44. The rock bit of claim 41, wherein the roller cone is a milled steel tooth cone.

45. The rock bit of claim 44, wherein the milled steel tooth cone further includes a gage surface, and the hardfacing coating is deposited on at least a portion of the gage surface.

46. The rock bit of claim 44, wherein the milled steel tooth cone further includes a heel row surface, and the hardfacing coating is deposited on at least a portion of the heel row surface.

47. The rock bit of claim 44, wherein the milled steel tooth cone further includes an inner row surface, and the hardfacing coating is deposited on at least a portion of the inner row surface.

48. The rock bit of claim 44, wherein the milled steel tooth cone further includes a tooth, and the hardfacing coating is deposited on at least a portion of the tooth.

49. The rock bit of claim 41, wherein the roller cone is a tungsten carbide insert cone.

50. The rock bit of claim 41, wherein the rock bit includes a shirttail, and the hardfacing coating is deposited over the shirttail.

51. The rock bit of claim 41, wherein the rock bit includes a journal, and the hardfacing coating is deposited over the journal.

52. The rock bit of claim 41, wherein the rock bit includes a piston, and the hardfacing coating is deposited over the piston.

* * * * *